United States Patent
Aizawa

(10) Patent No.: US 6,683,529 B1
(45) Date of Patent: Jan. 27, 2004

(54) TERMINAL DEVICE AND METHOD OF SETTING A TERMINAL DEVICE

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 616 days.

(21) Appl. No.: 09/615,205

(22) Filed: Jul. 13, 2000

(30) Foreign Application Priority Data

Jul. 13, 1999  (JP) .......................... P11-198608

(51) Int. Cl.[7] .................. H04Q 1/30; H04Q 7/00; G05B 19/02
(52) U.S. Cl. ............... 340/7.39; 340/7.4; 340/7.41; 340/825.22
(58) Field of Search ................. 340/7.39, 7.51, 340/7.55, 825, 7.4, 7.41, 825.22; 714/57

(56) References Cited

U.S. PATENT DOCUMENTS 5,012,234 A * 4/1991 Dulaney et al. ........... 340/7.39

6,384,848 B1 * 5/2002 Kojima et al. ............... 714/57

* cited by examiner

*Primary Examiner*—Brian Zimmerman
*Assistant Examiner*—Clara Yang
(74) *Attorney, Agent, or Firm*—Jay H. Maioli

(57) ABSTRACT

In the setting of a communication terminal, a message for setting the terminal is sent by radio and a command and data for setting the terminal, a text for indicating a successful setting, and a text for indicating a failed setting are included in the message. When the message for setting the terminal is received, the setting of the terminal is performed based on the command and data for setting the terminal included in the message. When the setting is successful, the text indicating the successful setting is displayed. When the setting fails, the text identifying the failure is displayed and information showing causes of the failure are displayed. When the setting of the terminal has failed, since the information showing the causes of the errors is displayed, it is possible to promptly cope with the situation.

21 Claims, 8 Drawing Sheets

| ADDRESS | KIND OF MESSAGE (NORMAL) | MESSAGE TEXT |
|---|---|---|
| 100 | 101 | 110 |

Fig. 5A

| ADDRESS | KIND OF MESSAGE (SYSTEM) | TERMINAL SETTING CHANGE COMMAND | TERMINAL SETTING CHANGE DATA | USER NOTICE TEXT (FOR SUCCESS) | USER NOTICE TEXT (FOR FAILURE) |
|---|---|---|---|---|---|
| 100 | 101 | 120 | 121 | 122 | 123 |

Adding NEWS Service was succeeded.

Fig. 6B

Adding NEWS Service was failed. Please

Call 800-xxx-yyyy

Err#:12345678

Fig. 9

| COMMAND | RETURN CODE | ERROR MESSAGE |
|---|---|---|
| ADDRESS ADDING | 123 ⋯ | THE NUMBER OF ADDRESS≧16 |
| ⋮ | ⋮ | ⋮ |
| ADDRESS DELETING | 456 ⋯ | ⋮ |

TERMINAL DEVICE AND METHOD OF SETTING A TERMINAL DEVICE

BACKGROUND OF THE INVENTION

1. Field of the Invention

The invention relates to a pager, namely, a terminal device suitable for use in the case where a setting is changed by radio in order to receive new information services and to a method of setting such a terminal device. More particularly, the invention relates to a trouble notice in case of a failure of the setting.

2. Description of the Related Art

Hitherto, a pager is used for receiving a call from a partner or receiving personal messages. However, in recent years, the pager is used not only in a field of receiving a call from the partner or receiving personal messages but also in a field of receiving information service messages such as news, weather report, and the like. The number of information service messages which are provided by the pager is increasing. The pager is being used as a portable information terminal which can easily access to various information by being carried outdoors.

To enable the information services to be used by the pager as mentioned above, it is necessary to change set information on the pager side. The change of the set information on the pager side has hitherto been performed at a sales store or a service store of the pager.

That is, as information services which are provided by the pager, various services such as traffic information, sales information, stock information, travel information, and the like as well as general information such as news and weather report are taken into consideration. The information services which are provided by the pager are informed by, for example, a guidebook or a brochure which is distributed by a service company of the pager, a magazine, a webpage of the Internet, or the like.

When the user of the pager wants to receive new information service messages by watching the guidebook or brochure distributed by the service company of the pager, magazine, webpage of the Internet, or the like, he brings his own pager to a sales store or a service store of the pager. At the sales store or service store of the pager, the setting of the pager is changed so that new information service messages can be received.

However, the number of information services which are provided by the pager is increasing day by day. Therefore, in the case where the user brings the pager to the sales store or service store of the pager and requests the service person to change the setting of the pager in order to receive new information service messages, it results in a large burden to both the user and the sales store or service store of the pager.

To prevent it, changing of the setting of the pager by messages by radio in a manner similar to the normal messages is taken into consideration.

That is, when the user of the pager wants to receive new information service messages, he calls a service center of the pager or takes a procedure for receiving new information service messages from the webpage of the Internet or sends its fact by E-mail.

After completion of such a telephone or a procedure on the Internet, messages including a terminal setting command and terminal setting data are transmitted by radio to the pager of the user from a management company of the pager in accordance with a request on the user side. When the pager of the user receives the messages including the terminal setting command and terminal setting data, the pager is set on the basis of the terminal setting command and terminal setting data. Thus, the new information service messages can be received.

If the messages including the terminal setting command and terminal setting data are sent from the management company of the pager by radio as mentioned above, when the user joins the new information services, the user does not need to bring the pager to the sales store or service store of the pager.

However, when the messages including the terminal setting command and terminal setting data are sent to the pager of the user and the setting of the pager of the user is changed as mentioned above, there is a case where the setting change has failed. If the setting has failed, the user notifies the pager management company of the fact that the setting was failed by telephone or E-mail.

When the management company of the pager is notified of the failure of the setting as mentioned above, if the details indicative of the reasons of the occurrence of an error are also sent, the management company side of the pager can rapidly takes a countermeasure against the inconvenience. In the conventional pager, however, when the setting has failed, the details of the error are obscure. On the management company side of the pager, even if the information indicative of the failure of the setting was received from the user, if the detailed information of the error is not known, the countermeasure against the error is delayed.

OBJECTS AND SUMMARY OF THE INVENTION

It is, therefore, an object of the invention to provide a terminal device in which a setting of a terminal is performed on the basis of received messages and, when the setting of the terminal has failed, a countermeasure against such an inconvenience can be rapidly taken and to provide a setting method of such a terminal device.

According to a preferred aspect of the invention, there is provided a terminal device comprising: message receiving means for receiving transmitted messages; terminal changing means for, when the received message is a message for setting a terminal, changing the setting of the terminal on the basis of the received message for setting the terminal; and display means for, when the change of the setting of the terminal has failed, forming information indicative of the failure and/or information showing causes of the failure and displaying the information.

According to another aspect of the invention, there is provided a method of setting a terminal device, comprising the steps of: receiving transmitted messages; when the received message is a message for setting a terminal, changing the setting of the terminal on the basis of the received message for setting the terminal; and when the change of the setting of the terminal has failed, displaying information indicative of the failure and/or information showing causes of the failure.

In case of changing the setting of the terminal, the message for setting the terminal is sent by radio. A command and data for setting the terminal, a text for success of the setting, and a text for failure of the setting are included in the message for setting the terminal. When the message for setting the terminal is received, the setting of the terminal is performed on the basis of the command and data for setting the terminal included in the message. When the setting is successful, the text for success of the setting is displayed.

When the setting has failed, the text for failure of the setting is displayed and the information showing the causes of the error is displayed. When the setting of the terminal has failed, since the information showing the causes of the error is displayed, it is possible to rapidly cope with the inconvenience.

By constructing the information showing the causes of the error by the command for setting the terminal and a return code returned after the command was executed, there is no need to particularly form the information showing the causes of the error.

Although the distribution of the message to the terminal device is performed by radio or by using a wire such as a network cable or the like, the invention can be applied to both distributing means.

The above and other objects and features of the present invention will become apparent from the following detailed description and the appended claims with reference to the accompanying drawings.

BRIEF DESCRIPTION OF THE DRAWINGS

FIGS. 5A and 5B are schematic diagrams showing formats of the pager apparatus to which the invention is applied;

FIGS. 6A and 6B are schematic diagrams for use in explanation of a display at the time of success of the setting and failure of the setting in the pager apparatus to which the invention is applied;

FIG. 9 is a schematic diagram for use in explanation of a process for converting the error code into a text.

DETAILED DESCRIPTION OF THE PREFERRED EMBODIMENT

Figure 1:
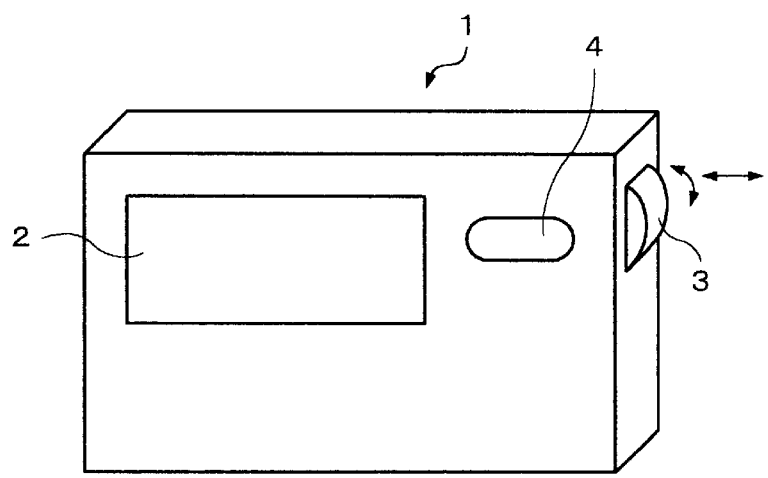
FIG. 1 is a perspective view showing a whole construction of a pager apparatus to which the invention is applied.

An embodiment of the invention will now be described hereinbelow with reference to the drawings. FIG. 1 shows an external construction of a pager 1 to which the invention is applied. As shown in FIG. 1, a display 2, a rotary knob 3 comprising a rotary encoder and a switch, and an escape key 4 are provided for the pager 1 to which the invention is applied.

Figure 2:
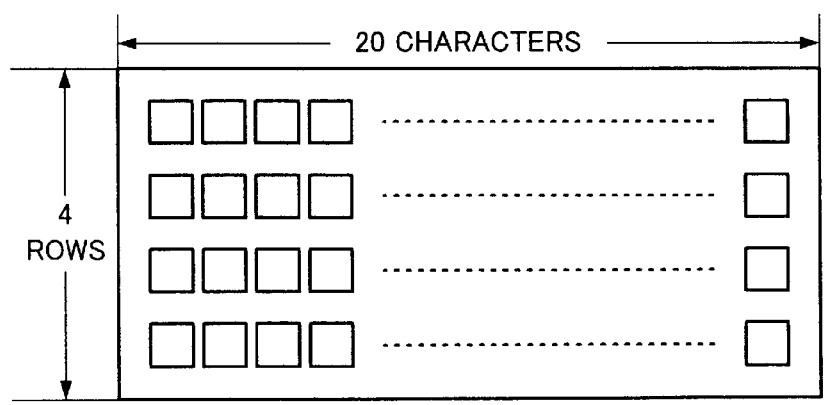
FIG. 2 is a schematic diagram for use in explanation of a display of the pager apparatus to which the invention is applied.

The display 2 is used for displaying characters of a received message. As shown in FIG. 2, an area of up to 80 characters (20 characters per row, and characters of four rows) is assured for the display 2.

The rotary knob 3 is used for scrolling a display on the display 2 or selecting a desired item. The rotary knob 3 is also used for inputting characters. The rotary knob 3 is constructed by the rotary encoder and switch and a pushing operation and a rotating operation can be performed. The rotating operation is used when the display on the display 2 is scrolled or the item is selected. The pushing operation is used when the selected item is set.

The escape key 4 is used for turning on a power supply of the pager or returning a display to a previous picture plane.

Figure 3:
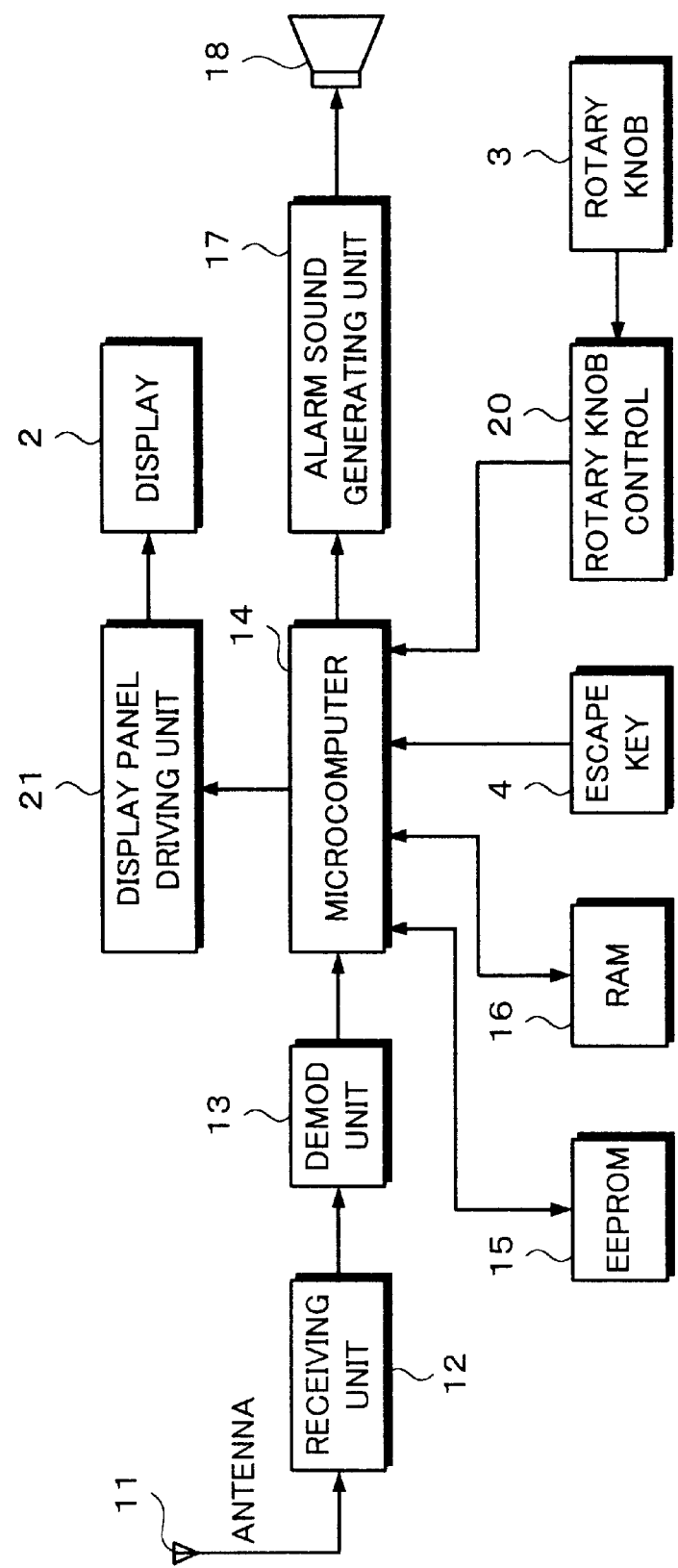
FIG. 3 is a block diagram showing, an internal construction of the pager apparatus to which the invention is applied.

FIG. 3 shows an internal construction of the pager 1 to which the invention is applied. In FIG. 3, a radio wave which is transmitted from a pager company is received by an antenna 11. A reception signal of the antenna 11 is supplied to a receiving unit 12. A reception signal of a predetermined carrier frequency is selected by the receiving unit 12.

An output of the receiving unit 12 is supplied to a demodulating unit 13. Data of the message is demodulated from the reception signal by the demodulating unit 13. The demodulated message data is sent to a microcomputer 14.

The microcomputer 14 controls the whole pager 1. An EEPROM 15 in which addresses, programs, and the like are stored and an RAM 16 in which messages or the like are stored are provided for the microcomputer 14.

An input is given to the microcomputer 14 through a rotary knob control unit 20 from the rotary knob 3 comprising the rotary encoder and switch and an input is also given from the escape key 4. An output from the microcomputer 14 is supplied to the display 2 via a display panel driving unit 21 and supplied to an alarm sound generating unit 17. The alarm sound generating unit 17 is a buzzer for indicating an incoming call or a warning.

When the pager 1 is called, a message is transmitted from a pager company to the pager 1. This signal is sent to the receiving unit 12 via the antenna 11. Message data is demodulated from this signal by the demodulating unit 13. The message data is sent to the microcomputer 14.

When the message data is received, the microcomputer 14 displays the message data onto the display 2 and sends a signal indicative of the receipt of the message to the alarm sound generating unit 17. Thus, a buzzer sound for indicating the incoming call is generated. The transmitted message is displayed on the display 2.

The transmitted message data is stored in the RAM 16. The stored message data can be displayed on the display 2 when the user operates the rotary knob 3 or escape key 4.

Figure 4A:
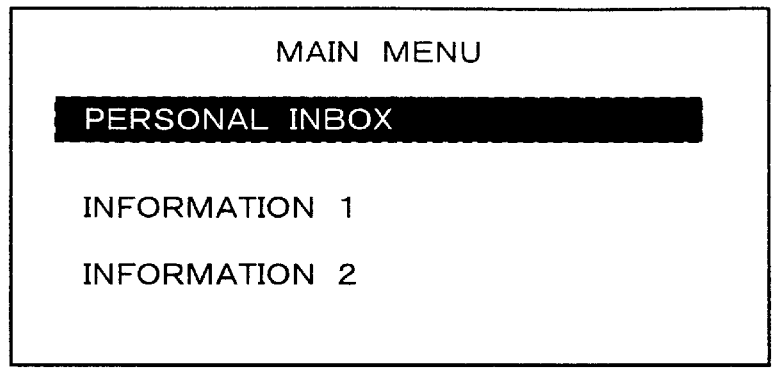
FIGS. 4A to 4C are schematic diagrams for use in explanation of a message display in the pager apparatus to which the invention is applied.
Figure 4B:
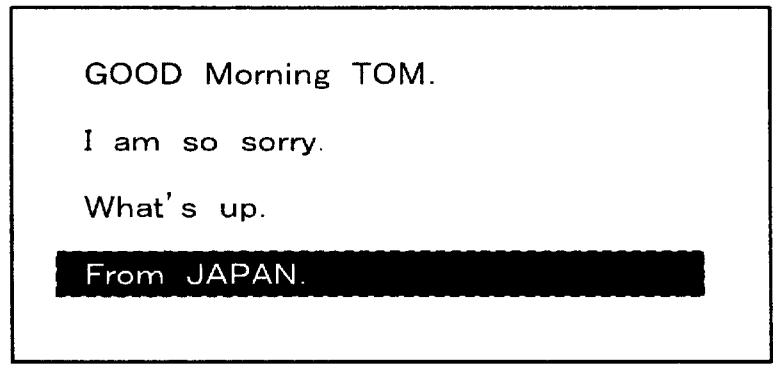
Figure 4C:
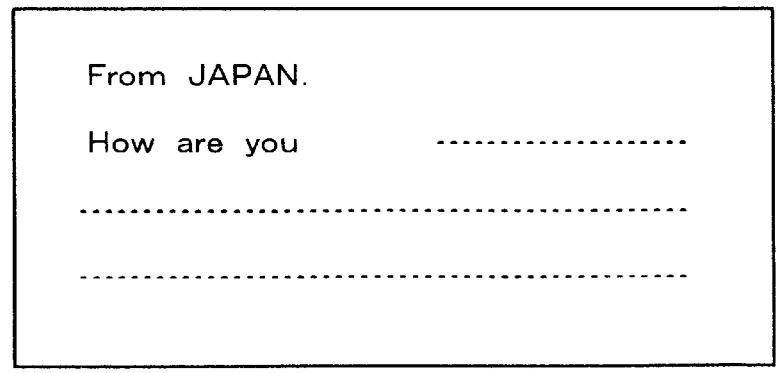

FIGS. 4A to 4C shows examples of a display of the display 2. As shown in FIG. 4A, in a main menu, a menu picture plane for selecting either a display of personal messages of the user or a display of various information services is displayed.

When the personal messages are read out, the rotary knob 3 is rotated and the personal messages are selected. The selected item is displayed as a highlighted image. As a highlighted display, surrounding characters, emphasis characters, underline, inverted characters, or the like can be taken into consideration. When the personal messages or information services are selected, the rotary knob 3 is pushed. When the rotary knob 3 is pushed, 18 characters (one row) in each message are displayed as a list of messages.

Subsequently, the rotary knob 3 is rotated and a desired message is selected from the list of the messages. The selected message is displayed as a highlighted image. When the message is selected, the rotary knob 3 is pushed. When the desired message is selected and the rotary knob 3 is pushed, characters of the selected message are displayed as shown in FIG. 4C.

Also when the display of various information services is selected, by selecting information services by the rotary knob 3 and pushing the rotary knob 3 is a similar manner, 18 characters in each message are displayed as a list of the messages. By further rotating the rotary knob 3, selecting a desired message from the list of the messages, and pushing the rotary knob 3, characters of the message of the selected information are displayed.

As mentioned above, in the pager 1 to which the invention is applied, the messages of various information services can be received. The messages of the information services are introduced by the guidebook or brochure from the service company of the pager, magazine, webpage of the Internet, or the like.

When the user of the pager wants to receive new information service messages by watching the guidebook or brochure from the service company of the pager, magazine, or the like, he calls the service center of the pager and takes a procedure, or when the user of the pager wants to receive new information service messages by watching the webpage of the Internet, he takes a procedure for receiving the new information service messages from the webpage or takes a procedure by sending a message indicative of such a request by E-mail.

After completion of the procedure on the telephone or the Internet as mentioned above, the messages including the terminal setting command and terminal setting data are sent from the management company of the pager to the pager of the user in response to the request on the user side. When the messages including the terminal setting command and terminal setting data are received to the pager of the user, the setting of the pager is performed on the basis of the terminal setting command and terminal setting data and messages of new information services can be received.

FIGS. 5A and 5B show formats of the messages which are sent to the pager. As messages, there are a normal message and a system message for performing the setting of the terminal.

FIG. 5A shows the format of the normal message. As shown in FIG. 5A, the normal message comprises an address 100, a kind of message 101, and a message text 110. The kind of message indicates that this message is the normal message. The message text is a main body of a text serving as a message.

FIG. 5B shows the format of the system message. As shown in FIG. 5B, the system message comprises the address 100, the kind of message 101, a terminal setting change command 120, terminal setting change data 121, a user notice text for success 122, and a user notice text for failure 123.

In the pager 1, when the normal message as shown in FIG. 5A is received, if the address is its own address, this message sent by the message text 110 is stored in the RAM 16. The user, therefore, can allow the message sent by the message text 110 to be displayed on the display 2 and can read it.

When the system message as shown in FIG. 5B is received, if the address is its own address, this message is temporarily stored in the RAM 16. The setting of the pager 1 is performed on the basis of the data shown by the terminal setting change command 120 and terminal setting change data 121. When the setting is succeeded, the message sent by the user notice text for success 122 is stored in the RAM 16. When the setting is failed, the message sent by the user notice text for failure 123 is stored in the RAM 16.

It is also possible to construct the terminal device in such a manner that when the setting of the pager 1 has been performed and in both the case where the setting is succeeded and the case where the setting is failed, for example, a user notice text for success or a user notice text for failure which has, previously been stored in the EEPROM 15 is extracted and stored or as a message in the RAM 16 or displayed.

Although the user notice text for success or failure has been stored in the RAM 16 in this example, it can be merely displayed without being stored in the RAM 16. Since, obviously, the user can read out those notice texts anytime in a manner similar to the normal message, it is preferable to store them into the RAM 16.

Further, according to the embodiment of the invention, when the setting is failed, an error code indicative of causes of the failure of the setting is formed. This error code is added to the message sent by the user notice text for failure 123 and the resultant message is stored in the RAM 16.

For example, in case of receiving the information service of news, an address add command is sent as a terminal setting change command 120 and "Adding NEWS Service was succeeded" is sent as a user notice text for success 122. "Adding NEWS Service was failed. Please call 800-xxx-yyyy" is sent as a user notice text for failure 123.

In this case, if the addition of the address was succeeded, "Adding NEWS Service was succeeded" sent as a user notice text for success 122 is stored in the RAM 16 and a message as shown in FIG. 6A is displayed on the display 2.

On the other hand, if the addition of the address was failed, "Adding NEWS Service was failed. Please call 800-xxx-yyyy" sent as a user notice text for failure 123 is stored in the RAM 16. An error code "Err:12345678" showing the causes of the failure of the addition of the address is formed. This error code is added to the user notice text for failure 123 and the resultant text is stored in the RAM 16. Therefore, when the addition of the address has failed, as shown in FIG. 6B, a message "Adding NEWS Service was failed. Please call 800-xxx-yyyy Err:12345678" is displayed on the display 2.

As mentioned above, when the setting is failed, the user notifies the management company of the pager of the failure of the setting by telephone or E-mail. In the embodiment of the invention, when the setting is failed, the error code showing the causes of the failure is added to the user notice text for failure 123. Therefore, when the user notifies the management company of the pager of the failure of the setting by telephone or E-mail, by notifying the company of the error code, a countermeasure process corresponding to the error code can be easily performed.

For example, there is a limitation in the number of addresses which can be set into the pager. For example, when the user tries to add sixteen or more addresses, an error occurs. When the addition of the address has failed, if the cause of the failure relates to a cause in which the number of addresses is equal to or larger than a specified value, an error code indicative of such a cause is formed and displayed on the display 2. In this case, therefore, if the user notifies the pager management company side of the error code when he notifies the management company of the pager of the failure of the setting by telephone or E-mail, the management company side of the pager knows that the address cannot be added because the number of addresses is equal to or larger than the specified value. Therefore, the management company can instruct a proper countermeasure by notifying the user of such a fact.

Figure 7:
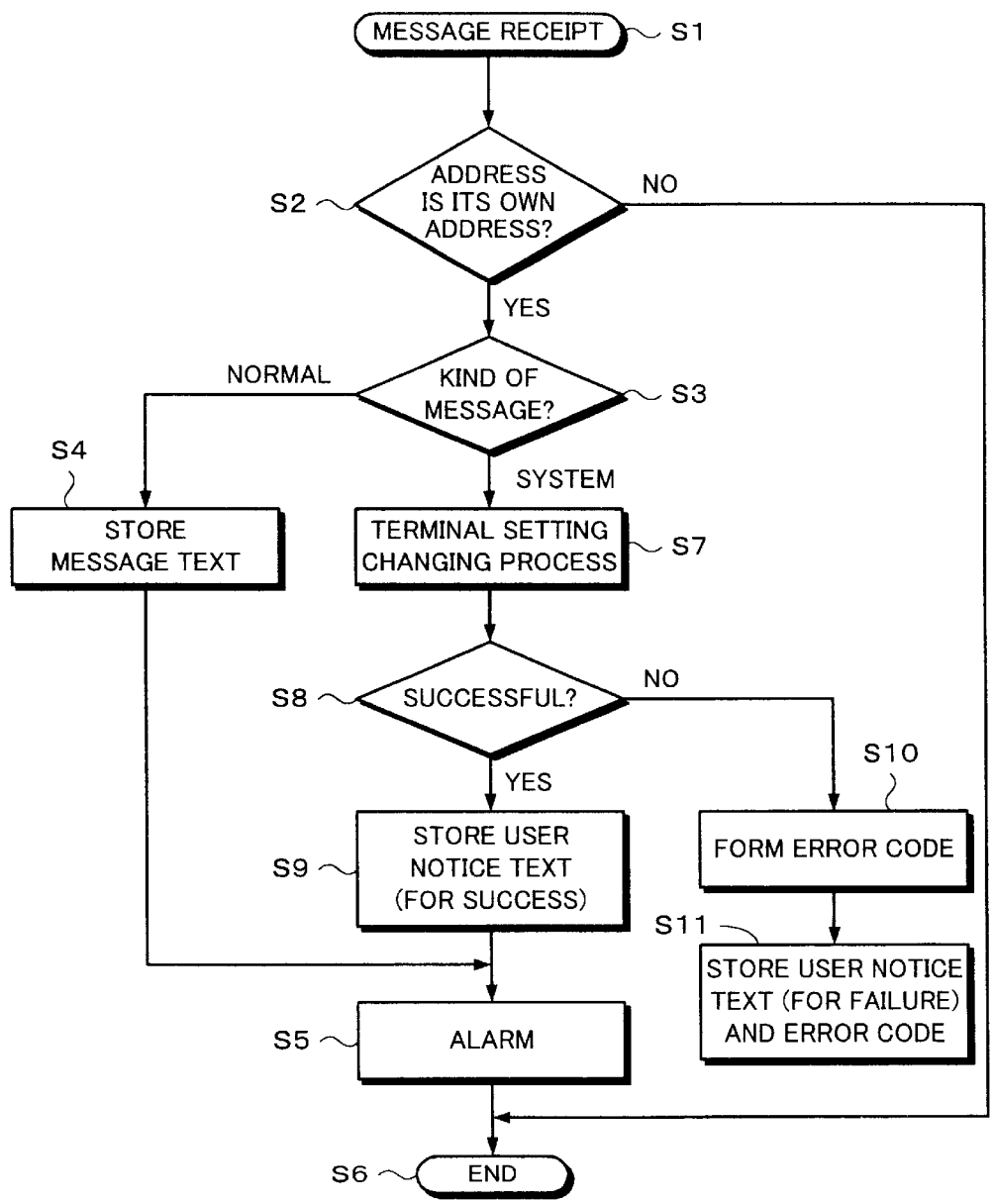
FIG. 7 is a flowchart for use in explanation of a receiving process in the pager apparatus to which the invention is applied.

FIG. 7 is a flowchart showing the above processes. As shown in FIG. 7, when the message is received (step S1), whether the address is its own address or not is discriminated (step S2). If the address is not its own address, step S6 follows and the processing routine is finished.

When the address of the received message is its own address, the kind of message is discriminated (step S3). The message can be discriminated, for example, from the kind of message 101 in the format of the message shown in FIGS. 5A and 5B.

If the received message is the normal message, the message sent as a message text 110 is stored in the RAM 16 (step S4), a buzzer sound to indicate the incoming call is generated (step S5), and the processing routine is finished (step S6).

When it is determined in step S3 that the kind of message indicates the system message, a terminal setting changing process is performed on the basis of the terminal setting change command 120 and terminal setting change data 121 (step S7). Whether the terminal setting changing process has been succeeded or not is discriminated (step S8).

When it is determined that the terminal setting changing process was successful, the message sent as a user notice text for success 122 is stored in the RAM 16 (step S9). Step S5 follows and the buzzer sound for indicating the incoming call is generated and the processing routine is finished (step 56).

When it is determined that the terminal setting changing process failed, the error code indicative of the causes of the failure is formed (step S10). The error code indicative of the causes of the failure is added to the message sent as a user notice text for failure 123 and the resultant message is stored in the RAM 16 (step S11). Step S5 follows and the buzzer sound for indicating the incoming call is generated and the processing routine is finished (step S6).

In the above example, whether the terminal setting changing process has been successful or not is discriminated in step S8, when it is not successful, the error code is formed in step S10. In addition, the error code indicative of the causes of the failure is added to the message sent as a user notice text for failure 123 and the resultant message is stored in the RAM 16 in step S11. However, when the command is executed, a return code corresponding thereto is returned. Therefore, when the setting has failed, if the command and the return code, which is returned due to the execution of the command, are added as they are to the message sent as a user notice text for failure 123, because the details of the error can be known from them, there is no need to particularly form the error code.

Figure 8:
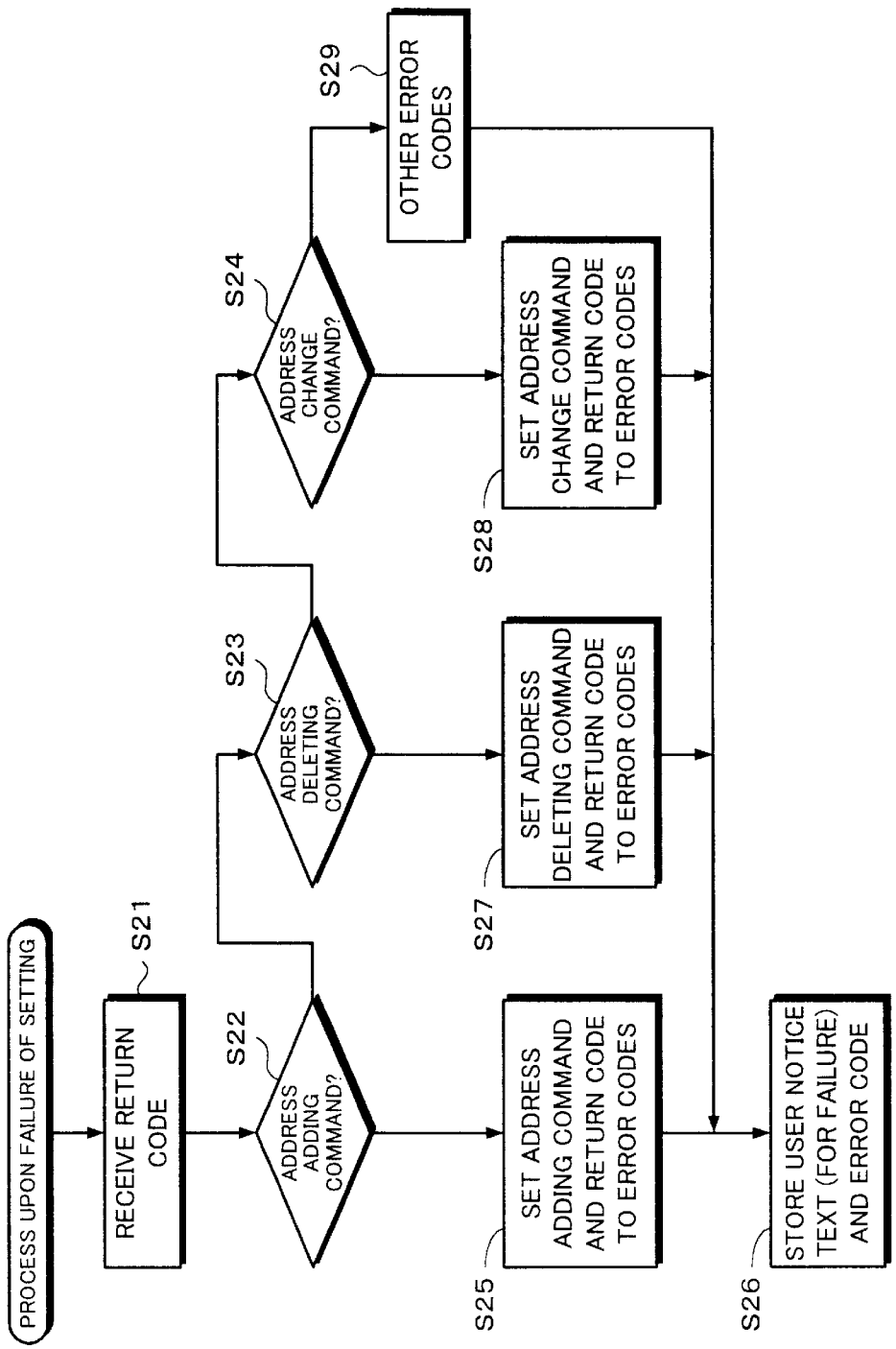
FIG. 8 is a flowchart for use in explanation of formation of an error code in the pager apparatus to which the invention is applied.

FIG. 8 shows processes when the setting has failed, for example, a command to add an address, a command to delete the address, and a command to change the address are sent upon a setting failure. When those commands are executed, the return code is returned in accordance with them, and the return code is received (step S21).

Whether the executed command is the command to add the address or not is discriminated (step S22). Whether it is the command to delete the address or not is discriminated (step S23). Whether it is the command to change the address or not is discriminated (step S24).

When it is determined in step S22 that the executed command is the address adding command, the address adding command and the return code are set to the error code (step S25). The error code formed in step S25 is added to the message sent as a user notice text for failure 123 and the resultant message is stored in the RAM 16 (step S26).

When it is determined in step S23 that the executed command is the command to delete the address, the command to delete the address and the return code returned in this instance are set to the error code (step S27). The error code formed in step S27 is added to the message sent as a user notice text for failure 123 and the resultant message is stored in the RAM 16 (step S26).

When it is determined in step S24 that the executed command is the command to change the address, the command to change the address and the return code returned in this instance are set to the error code (step S28). The error code formed in step S28 is added to the message sent as a user notice text for failure 123 and the resultant message is stored in the RAM 16 (step S26).

In case of the other errors, other error codes are formed (step S29). The error code formed in step S29 is added to the message sent as a user notice text for failure 123 and the resultant message is stored in the RAM 16 (step S26).

In the above example, the error code is displayed on the display as it is. Since there is a limitation in a display area of the display of the pager, if the error code is displayed, the causes of the failure of the setting can be certainly known by a small display region. However, if the error code is displayed as it is, the user cannot recognize the causes of the failure of the setting at a glance. It is, therefore, also possible to prepare a table showing the correspondence relation between the error code and the messages indicative of the causes of the errors, extract the message corresponding to the error code by using the table, and display the message indicative of the causes of the error by a text.

For example, as shown in FIG. 9, a table in which the commands and texts of the error messages corresponding to the return codes which are returned at the time of the execution of the commands have been stored is prepared. When the setting has failed, the corresponding error message is extracted by using such a table on the basis of the command and the return code that is returned at the time of the execution of the command and the text of this error message is displayed. By this method, the user can recognize the causes of the errors at a glance when the setting is failed.

It is also possible to construct the terminal device so that the user can properly select either the mode of the display or storage by the error code or the mode of the display or storage of the message by the table showing the correspondence relation between the error code and the message.

According to the invention, the terminal setting is changed on the basis of the transmitted message for setting the terminal. In case of changing the setting of the terminal, the message for setting the terminal is transmitted by radio. A command and data for setting the terminal, a text for success of the setting, and a text for failure of the setting are included in the message for setting the terminal. When the message for setting the terminal has been received, the setting of the terminal is performed on the basis of the command and data for setting the terminal included in the message. When the setting is successful, the text for success of the setting is displayed. When the setting has failed, the text for failure of the setting is displayed and the information showing the causes of the errors is displayed. When the setting of the terminal has failed, since the information showing the causes of the errors is displayed, it is possible to promptly cope with the inconvenience.

By setting the information showing the causes of the errors into the terminal setting command and the return code returned due to the execution of the command, there is no need to particularly form the information showing the causes of the errors.

Since the information as a result of the setting of the terminal can be also stored in the memory in a manner similar to the normal received message, it can be displayed in accordance with convenience of the user. The management company of the pager can be notified of the failure of the setting of the terminal at an arbitrary time of the user.

The present invention is not limited to the foregoing embodiment but many modifications and variations are possible within the spirit and scope of the appended claims of the invention.

What is claimed is:

1. A terminal device comprising:
   message receiving means for receiving a transmitted message;
   terminal setting means operable for setting a terminal when the message received by said receiving means is the message for setting a terminal; and
   forming means operable for forming information indicative of a failure and/or information showing causes of the failure when the terminal setting means has failed to set the terminal,
   wherein said message for setting the terminal includes a text for indicating a success of the setting and a text for indicating a failure of the setting, and
   said forming means extracts said text for indicating a success of the setting from said message when said setting of the terminal is successful, and
   extracts said text for indicating a failure of the setting from said message when said setting of the terminal has failed.

2. The terminal device according to claim 1, further comprising display means for displaying the information formed by said forming means.

3. The terminal device according to claim 2, wherein said display means displays said information indicative of the causes of the failure by a code.

4. The terminal device according to claim 2, wherein said forming means forms said information indicative of the causes of the failure by a code, and the code of the information indicative of the causes of the failure is converted into a text showing the causes of the failure and said text is displayed on said display means.

5. The terminal device according to claim 1, further comprising memory means for storing the message received by said receiving means, and
   wherein the information formed by said forming means is also stored in said memory means.

6. The terminal device according to claim 5, further comprising display means for displaying the message stored in said memory means, and
   wherein the information formed by said forming means is also displayed by said display means.

7. The terminal device according to claim 6, wherein said display means displays said information indicative of the causes of the failure by a code.

8. The terminal device according to claim 5, wherein said forming means forms said information indicative of the causes of the failure by a code, and the code of the information indicative of the causes of the failure is converted into a text showing the causes of the failure and said text is stored in said memory means.

9. The terminal device according to claim 1, wherein when said setting of the terminal has failed, said forming means adds said information indicative of the causes of the failure to said text for indicating a failure of the setting and forms said information.

10. The terminal device according to claim 1, wherein said forming means forms said information indicative of the causes of the failure by a code.

11. The terminal device according to claim 10, wherein said forming means converts the code of said information indicative of the causes of the failure into a text indicative of the causes of the failure.

12. A method of setting a terminal device, comprising the steps of:
    receiving a transmitted message;
    when said received message is a message for setting a terminal, setting the terminal based on the received message for setting the terminal; and
    when the setting of the terminal has failed, displaying information indicative of the failure and/or information showing causes of the failure, wherein
    said message for setting the terminal includes a text for indicating a success of the setting and a text for indicating a failure of the setting,
    said text for indicating a success of the setting is displayed when said setting of the terminal is successful, and
    said text for indicating a failure of the setting is displayed when said setting of the terminal has failed.

13. The method according to claim 12, wherein when said setting of the terminal has failed, said information indicative of the causes of the failure is added to said text for indicating a failure of the setting and said text is displayed.

14. The method according to claim 12, wherein said information indicative of the causes of the failure is displayed by a code.

15. The method according to claim 14, wherein the code of said information indicative of the causes of the failure is converted into a text indicative of the causes of the failure and said text is displayed.

16. A method of setting a terminal device, comprising the steps of:
    receiving a transmitted message;
    when said received message is a message for setting a terminal, setting the terminal based on the received message for setting the terminal; and
    when the setting of the terminal has failed, storing information indicative of the failure and/or information showing causes of the failure into a memory device, wherein
    said message for setting the terminal includes a text for indicating a success of the setting and a text for indicating a failure of the setting,
    said text for indicating a success of the setting is stored when said setting of the terminal is successful, and
    said text for indicating a failure of the setting is stored when said setting of the terminal has failed.

17. The method according to claim 16, wherein said information indicative of the failure and/or said information showing the causes of the failure stored in said memory device is extracted from said memory device and displayed.

18. The method according to claim 17, wherein said information showing causes of the failure is stored by a code, said stored code is converted into a text showing the causes of the failure, and said text is displayed.

19. The method according to claim 16, wherein when said setting of the terminal has failed, said information indicative of the causes of the failure is added to said text for indicating a failure of the setting and said text is stored.

20. The method according to claim 16, wherein said information indicative of the causes of the failure is stored by a code.

21. The method according to claim 20, wherein the code of said information indicative of the causes of the failure is converted into a text indicative of the causes of the failure and said text is stored.

* * * * *